(12) United States Patent
Kurosaki

(10) Patent No.: US 11,819,875 B2
(45) Date of Patent: *Nov. 21, 2023

(54) ADHESIVE APPLICATION SYSTEM

(71) Applicant: TANAKA SEIMITSU KOGYO CO., LTD., Toyama (JP)

(72) Inventor: Eiichi Kurosaki, Toyama (JP)

(73) Assignee: TANAKA SEIMITSU KOGYO CO., LTD., Toyama (JP)

(*) Notice: Subject to any disclaimer, the term of this patent is extended or adjusted under 35 U.S.C. 154(b) by 0 days.

This patent is subject to a terminal disclaimer.

(21) Appl. No.: 17/907,761

(22) PCT Filed: Mar. 10, 2021

(86) PCT No.: PCT/JP2021/009446
§ 371 (c)(1),
(2) Date: Aug. 29, 2022

(87) PCT Pub. No.: WO2021/182496
PCT Pub. Date: Sep. 16, 2021

(65) Prior Publication Data
US 2023/0132584 A1    May 4, 2023

(30) Foreign Application Priority Data
Mar. 12, 2020  (JP) .................. 2020-042685

(51) Int. Cl.
| | | |
|---|---|---|
| *B05C 5/02* | (2006.01) | |
| *B05B 15/68* | (2018.01) | |
| *C09J 5/06* | (2006.01) | |

(52) U.S. Cl.
CPC .............. *B05C 5/02* (2013.01); *B05B 15/68* (2018.02); *C09J 5/06* (2013.01)

(58) Field of Classification Search
USPC ........ 118/313, 315, 325; 156/250, 261, 510, 156/908, 578
See application file for complete search history.

(56) References Cited

U.S. PATENT DOCUMENTS

| 2017/0201163 A1 | 7/2017 | Chung et al. |
| 2019/0259531 A1 | 8/2019 | Okudaria et al. |

(Continued)

FOREIGN PATENT DOCUMENTS

| JP | 2001-25218 | 1/2001 |
| JP | 2001-321850 | 11/2001 |

(Continued)

OTHER PUBLICATIONS

International Search Report (ISR) dated May 18, 2021 in International (PCT) Application No. PCT/JP2021/009446.

(Continued)

*Primary Examiner* — Yewebdar T Tadesse
(74) *Attorney, Agent, or Firm* — Wenderoth, Lind & Ponack, L.L.P.

(57) ABSTRACT

Provided is an adhesive application system configured to apply a necessary and sufficient amount of an adhesive to a thin steel strip without causing an increase in the equipment cost. The adhesive application system comprises an adhesive application device having adhesive dispensing nozzles (26, 27) for dispensing an adhesive to an adhesive application surface of a thin steel strip; a mechanism configured to elevate and lower the adhesive application device; and adhesive supply ports (17, 18) for supplying the adhesive at a predetermined pressure to the adhesive application device, wherein the adhesive application device has an end face that is to be brought into abutment against the thin steel strip, and wherein outlets of the adhesive dispensing nozzles (26, 27) are spaced inwardly away from the end face of the adhesive application device so that the outlets of the adhesive dis- (Continued)

pensing nozzles (26, 27) are maintained at a predetermined distance from a lower surface of the thin steel strip.

16 Claims, 9 Drawing Sheets

(56) References Cited

U.S. PATENT DOCUMENTS

| | | | |
|---|---|---|---|
| 2021/0031227 A1* | 2/2021 | Kurosaki | ............ B05C 11/1042 |
| 2021/0057969 A1 | 2/2021 | Okudaira et al. | |
| 2022/0165492 A1 | 5/2022 | Okudaira et al. | |

FOREIGN PATENT DOCUMENTS

| | | |
|---|---|---|
| JP | 2009-124828 | 6/2009 |
| JP | 2015-76970 | 4/2015 |
| JP | 2019-103217 | 6/2019 |
| WO | 2018/127983 | 7/2018 |
| WO | 2019/167803 | 9/2019 |
| WO | 2019/168022 | 9/2019 |
| WO | 2019/180856 | 9/2019 |

OTHER PUBLICATIONS

International Preliminary Report on Patentability and Written Opinion of the International Searching Authority dated Sep. 6, 2022 in International (PCT) Application No. PCT/JP2021/009446.

* cited by examiner

Fig. 9
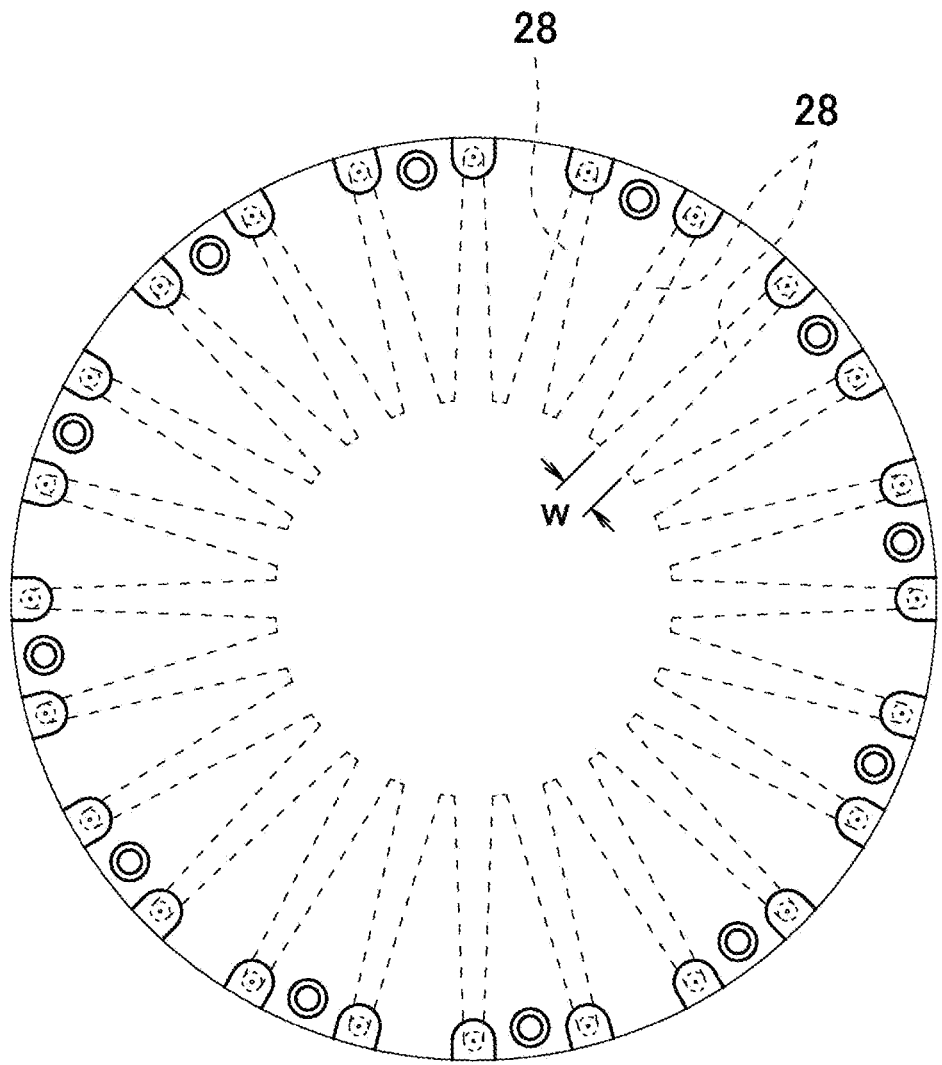
Fig. 10
Fig. 10A Before steel strip is pressed against the end faces of adhesive application devices
Fig. 10B Steel strip is pressed against the end faces of adhesive application devices
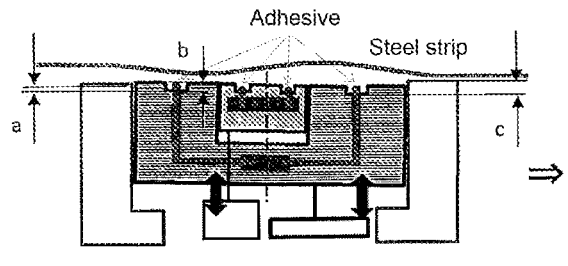
$a<b<c$
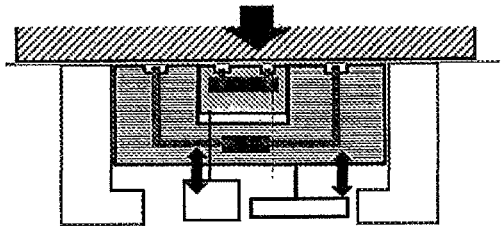
$a=b=c$

ADHESIVE APPLICATION SYSTEM

TECHNICAL FIELD

The present invention relates to an adhesive application system.

In particular, the present invention relates to an adhesive application system for applying an adhesive to a thin steel strip.

BACKGROUND ART

Laminated steel cores for rotating electric machines are generally manufactured from an electromagnetic steel hoop (thin steel strip) as a starting material by feeding the thin steel strip to a progressive die assembly. In the die assembly, the thin steel strip is subjected to progressive punching operation to create a predetermined shape, such as pilot holes, slots and inner teeth, thereby producing steel core sheets in a sequential manner. Then, a predetermined number of the steel core sheets are stacked on top of one another and bonded together to form a laminated steel core. The steel core sheets are conventionally assembled together by lamination interlocking, in which steel core sheets are provided with projections and recesses for interlocking, and stacked on top of one another and interlocked together under pressure. Alternatively, the steel core sheets are assembled together by lamination welding, in which steel core sheets are stacked on top of one another and welded together by laser. However, these lamination techniques suffer from the drawback of deterioration of the magnetic properties at the interlocking locations or the welded locations. Under these circumstances, lamination bonding has been widely proposed as an alternative technique, in which an adhesive is applied to the surface of a thin steel strip in a die assembly, and steel core sheets are punched out from the thin steel strip and are stacked on top of one another and bonded together to form a laminated steel core.

For example, Patent literature 1 discloses an apparatus for producing a laminated steel core. In the production process of a laminated steel core formed from a plurality of steel core sheets using the apparatus as shown in FIG. 11 attached hereto, a thin steel strip 34 is punched to sequentially create (1) pilot holes, (2) a prefabricated hole for forming the central hole of a steel core sheet and small holes for forming grooves on the outer edge of the steel core sheet, (3) slots, (4) the central hole of the steel core sheet, and (5) internal grooves (teeth), thereby creating the basic shape of the steel core sheet except for the external shape. The thin steel strip is then successively subjected to (6) adhesive application step, (7) blanking step, (8) rotary stacking step, and (9) heating step. In the figure, the numeral 31 denotes an upper die, the numeral 32 denotes a lower die, and the numeral 33 denotes the laminated steel core. The apparatus for producing a laminated steel core comprises an adhesive application device 35 within the lower die 32. The adhesive application device 35 is used to apply an adhesive to the lower surface of the thin steel strip 34 and has an elevating unit therein.

CITATION LIST

Patent Literature

Patent literature 1: JP 2009-124828 A

SUMMARY OF INVENTION

Technical Problem

In the apparatus for producing a laminated steel core as disclosed in Patent literature 1 as shown in FIG. 12 attached hereto, an adhesive is pressurized with a pressurizing device 44 of an adhesive supply unit 43, and is supplied through a duct 46 composed of tubes 45a, 45b and then through a through duct 47 to an adhesive pool 48 where the adhesive is stored. A thin steel strip 34 is brought into abutment against the top surface 36 of a lower die, and then the adhesive stored in the adhesive pool 48 is dispensed from dispense nozzles 37 and applied to the lower surface of the thin steel strip 34. When the adhesive is not desired to be applied to the lower surface of the thin steel strip 34, a drive device 38 drives a drive member 39 to retract and allows a cam surface 39a of the drive member 39 to engage with a cam surface 40a of a base body 40, and an adhesive dispense unit 41 is lowered to the lower limit position, thereby preventing the application of the adhesive to the lower surface of the thin steel strip 34. In short, the apparatus for producing a laminated core as disclosed in Patent literature 1 utilizes the upward and downward movement of the adhesive dispense unit 41 to apply the adhesive to the lower surface of the thin steel strip 34. Due to this upward and downward movement of the adhesive dispense unit 41, the cam surface 39a and the cam surface 40a gradually wear out, and as a result, the amount of the adhesive applied to the lower surface of the thin steel strip 34 may vary. In addition, because of the upward and downward movement of the adhesive dispense unit 41, when a plurality of the dispense nozzles 37 are provided for the apparatus for producing a laminated core as disclosed in Patent literature 1, a slight inclination of an adhesive introducing block 42 may cause variations in the distance from the dispense nozzles 37 to the lower surface of the thin steel strip 34.

The present invention relates to an improved apparatus and method for solving the above problems in the conventional art. An object of the present invention is to provide an adhesive application system configured to apply a necessary and sufficient amount of an adhesive to a thin steel strip without causing an increase in the equipment cost.

Solution to Problem

A first aspect of the invention of the present application for solving the above problems is directed to an adhesive application system for applying an adhesive to a thin steel strip in a process comprising punching the thin steel strip into core sheets with a predetermined shape and stacking and bonding the core sheets together, the adhesive application system comprising an adhesive application device having an adhesive dispensing nozzle for dispensing an adhesive to an adhesive application surface of a thin steel strip;

a mechanism configured to elevate and lower the adhesive application device; and an adhesive supply port for supplying the adhesive at a predetermined pressure to the adhesive application device, wherein the adhesive application device has an end face that is to be brought into abutment against the thin steel strip, and wherein an outlet of the adhesive dispensing nozzle is spaced inwardly away from the end face of the adhesive application device so that the outlet of the adhesive dispensing nozzle is maintained at a predetermined distance from a lower surface of the thin steel strip.

A second aspect of the invention of the present application is directed to the adhesive application system according to the first aspect of the invention, wherein the adhesive application device is located above or below the thin steel strip.

A third aspect of the invention of the present application is directed to the adhesive application system according to the first or second aspect of the invention, further comprising a mechanism configured to bring the thin steel strip into abutment against the adhesive application device at the timing when the thin steel strip is punched into a predetermined shape.

A fourth aspect of the invention of the present application is directed to the adhesive application system according to any one of the first to third aspects of the invention, wherein a plurality of adhesive dispensing nozzles are provided, and wherein the plurality of adhesive dispensing nozzles communicate with each other.

A fifth aspect of the invention of the present application is directed to the adhesive application system according to any one of the first to fourth aspects of the invention, further comprising a heating mechanism for the adhesive.

ADVANTAGEOUS EFFECTS OF INVENTION

According to the first, second and third aspects of the invention, even when an error in the elevation distance of the adhesive application device occurs, a necessary and sufficient amount of the adhesive is applied to the thin steel strip. According to the fourth aspect of the invention, a uniform amount of the adhesive is applied to the thin steel strip. According to the fifth aspect of the invention, the fluidity of the adhesive is increased and the adhesive can easily be applied to the thin steel strip.

BRIEF DESCRIPTION OF DRAWINGS

FIG. 9 is a plan view of another embodiment of adhesive flow passages in the adhesive application system of the present invention.

FIG. 10 is a schematic view illustrating advantageous effects of the adhesive application devices of the present invention.

DESCRIPTION OF EMBODIMENTS

Embodiments of the present invention will be described below with reference to the attached drawings. Various alterations and modifications are possible within the technical scope of the present invention.

Figure 1:
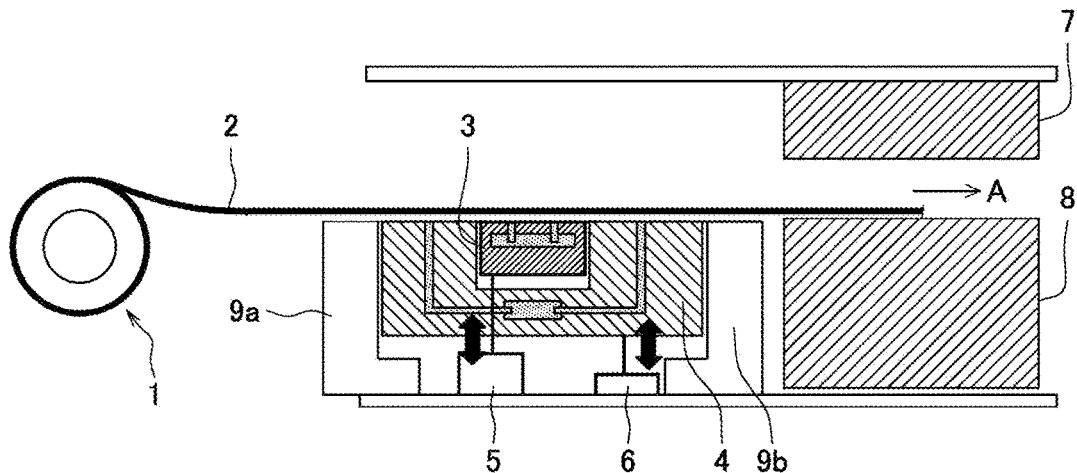
FIG. 1 is a schematic configuration diagram of an embodiment of an apparatus for producing a laminated steel core comprising an adhesive application system of the present invention and other devices placed in-line before and after the adhesive application system.

FIG. 1 is a schematic configuration diagram of an embodiment of an apparatus for producing a laminated steel core comprising the adhesive application system of the present invention and other devices placed in-line before and after the adhesive application system. In the figure, the numeral 1 denotes a coil of a wound thin steel strip 2. The numeral 3 denotes an inner adhesive application device. The numeral 4 denotes an outer adhesive application device. The numeral 5 denotes an elevating and lowering mechanism configured to elevate and lower the inner adhesive application device. The numeral 6 denotes an elevating and lowering mechanism configured to elevate and lower the outer adhesive application device. The numeral 7 denotes an upper die, and the numeral 8 denotes a lower die. The inner and outer adhesive application devices 3, 4 are configured to be independently elevated and lowered by the elevating and lowering mechanisms 5, 6, respectively. The inner and outer adhesive application devices 3, 4 are located immediately before the upper and lower dies as shown in FIG. 1. The thin steel strip 2 is drawn from the coil 1, and an adhesive is applied to the lower surface of the thin steel strip 2 using the inner and outer adhesive application devices 3, 4. The thin steel strip 2 is then punched by the upper and lower dies 7, 8 and optionally subsequent upper and lower dies to create a predetermined shape, and transferred in the direction indicated by the arrow A.

Figure 2:
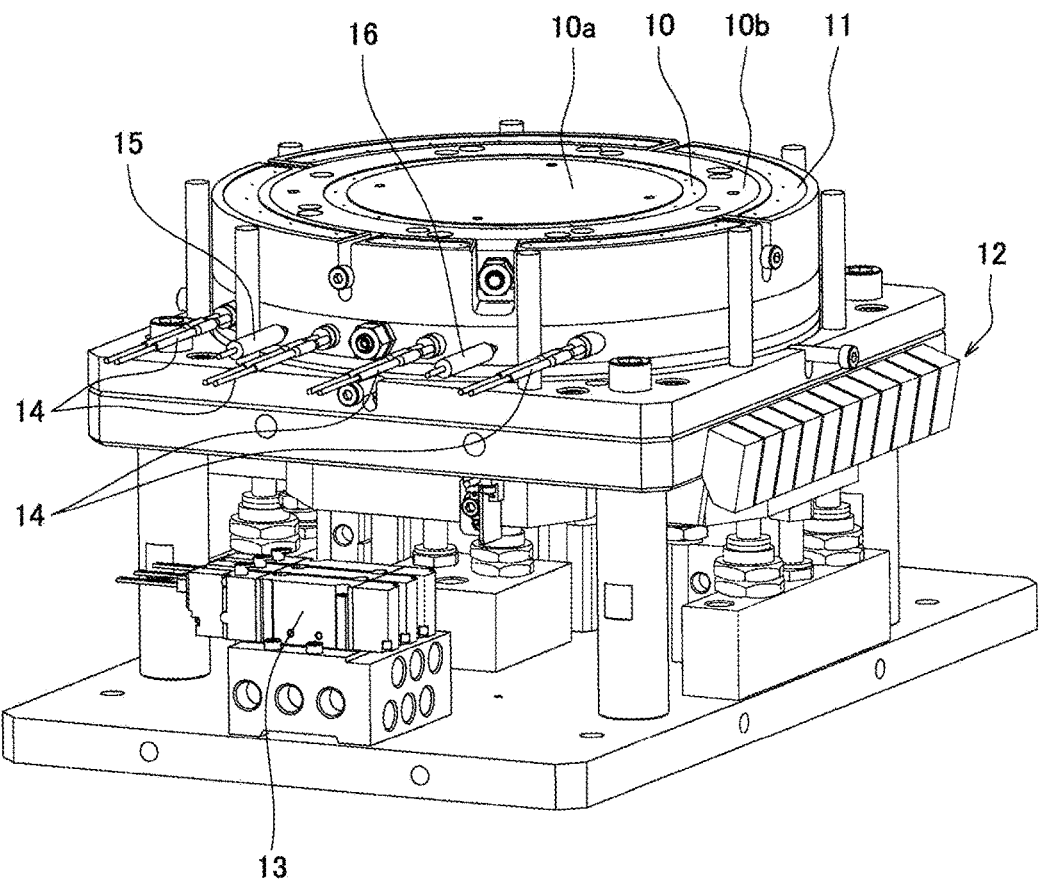
FIG. 2 is a perspective view of an embodiment of the adhesive application system of the present invention.

FIG. 2 is a perspective view of an embodiment of the adhesive application system of the present invention. In the figure, the numeral 10 denotes an annular groove-shaped adhesive application zone of the inner adhesive application device 3. The numeral 11 denotes circular arc groove-shaped adhesive application zones of the outer adhesive application device 4. The annular groove-shaped adhesive application zone 10 is configured to be elevated and lowered together with a central circular area 10a and an outer annular area 10b of the inner adhesive application device 3 by one of the elevating and lowering mechanisms (described in detail later). The circular arc groove-shaped adhesive application zones 11 are configured to be elevated and lowered by another elevating and lowering mechanism. The numeral 12 denotes a plurality of laser sensors for sensing the application of the adhesive to the thin steel strip. The numeral 13 denotes an electromagnetic valve for controlling the elevating and lowering movement of the elevating and lowering mechanisms configured to elevate and lower the inner and outer adhesive application devices. The numeral 14 denotes cartridge heaters for increasing the temperature of the adhesive. The numeral 15 denotes a temperature sensor for sensing the temperature of the inner adhesive application device 3 comprising the annular groove-shaped adhesive application zone 10 and the central circular area 10a and the outer annular area 10b. The numeral 16 denotes a temperature sensor for sensing the temperature of the outer adhesive application device 4 comprising the circular arc groove-shaped adhesive application zones 11.

Figure 3:
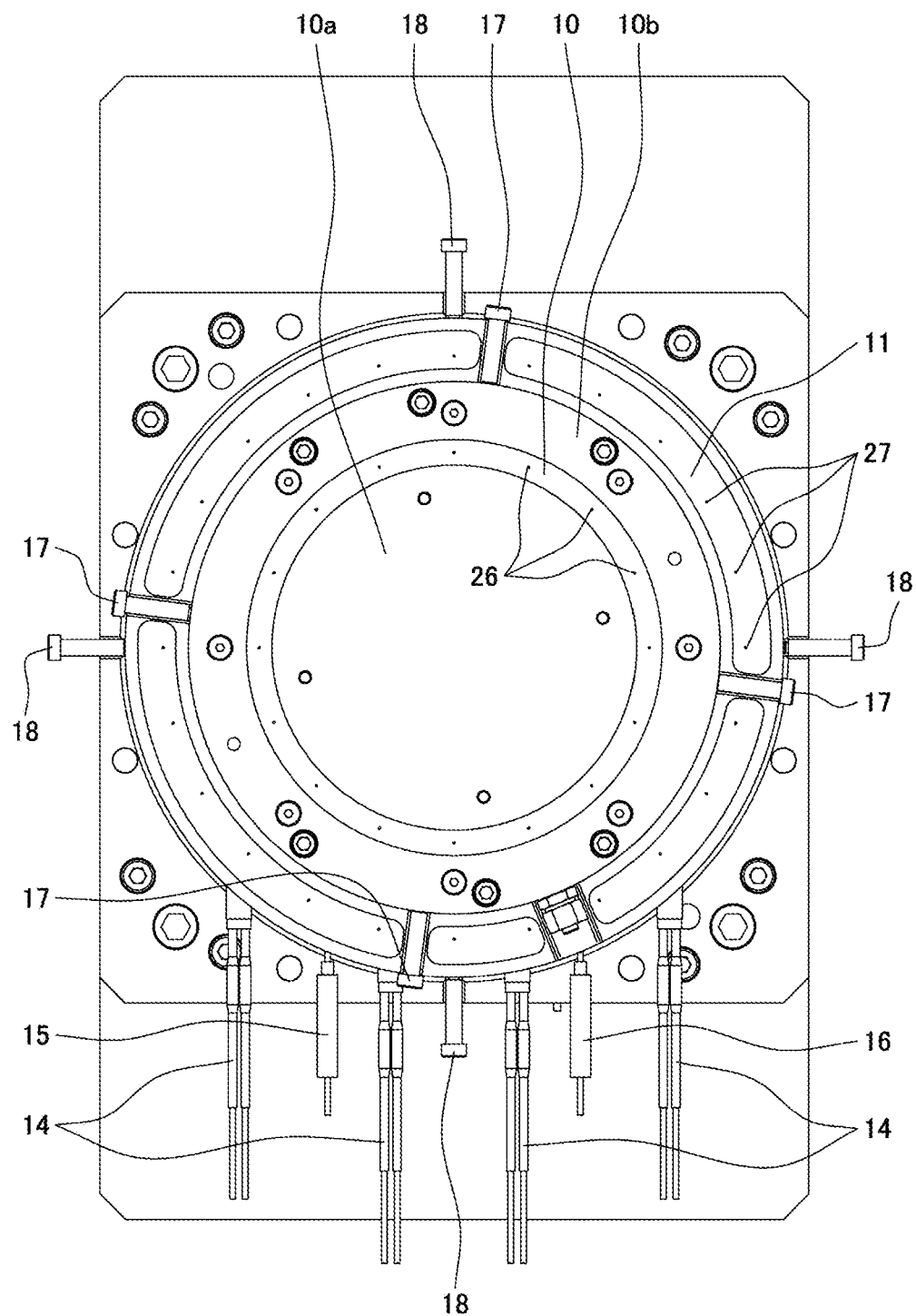
FIG. 3 is a plan view of an embodiment of the adhesive application system of the present invention.

FIG. 3 is a plan view of an embodiment of the adhesive application system of the present invention. The numeral 17 denotes adhesive supply ports for supplying the adhesive to the annular groove-shaped adhesive application zone 10 of the inner adhesive application device 3. The numeral 18 denotes adhesive supply ports for supplying the adhesive to the circular arc groove-shaped adhesive application zones 11 of the outer adhesive application device 4. The adhesive supply ports 17, 18 are detachable. The adhesive supplied from the adhesive supply ports 17 is dispensed from the outlets of adhesive dispensing nozzles 26 distributed along the annular groove of the adhesive application zone 10. The adhesive supplied from the adhesive supply ports 18 is dispensed from the outlets of adhesive dispensing nozzles 27 distributed along the circular arc grooves of the adhesive application zones 11.

Figure 4:
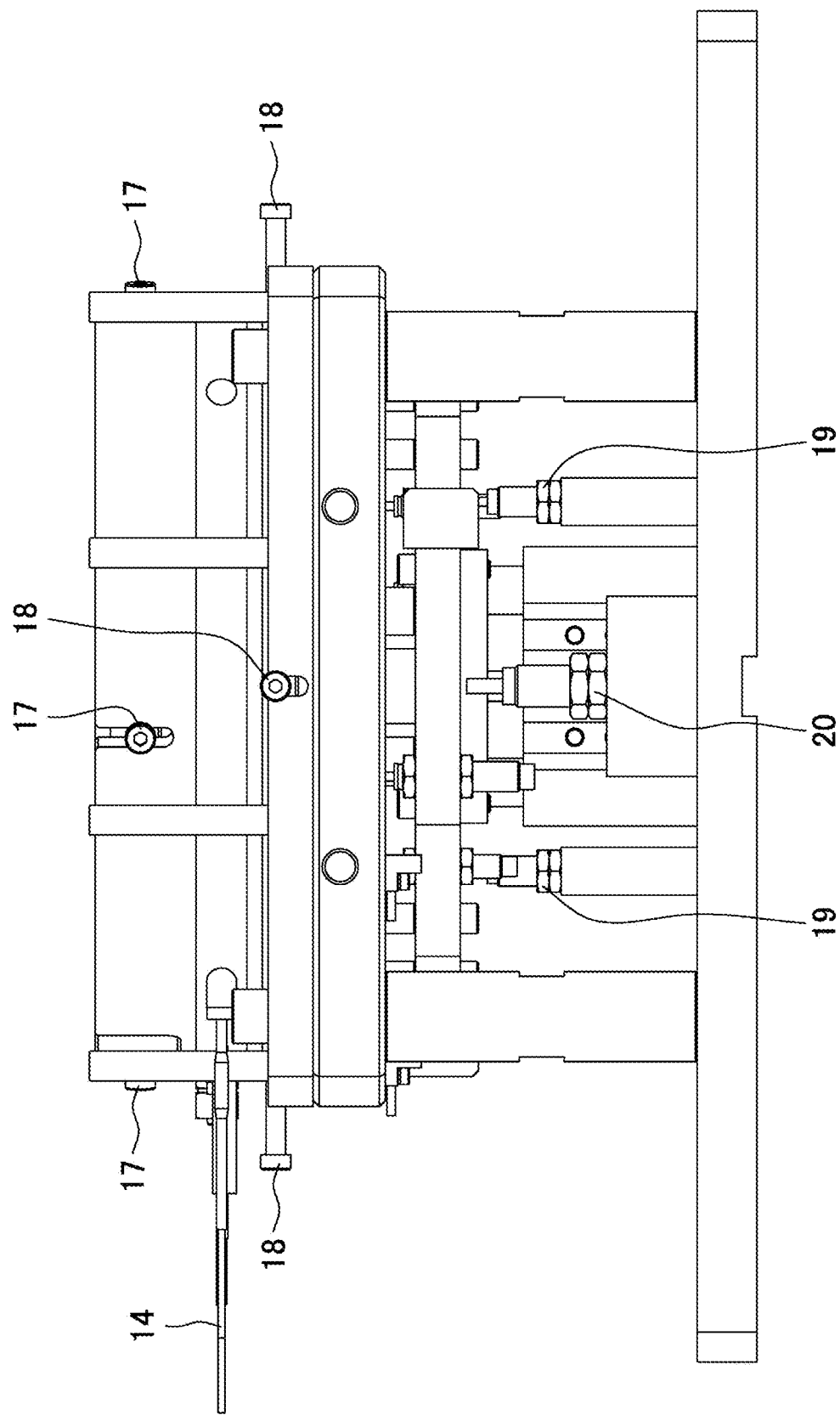
FIG. 4 is a side view of an embodiment of the adhesive application system of the present invention.
Figure 5:
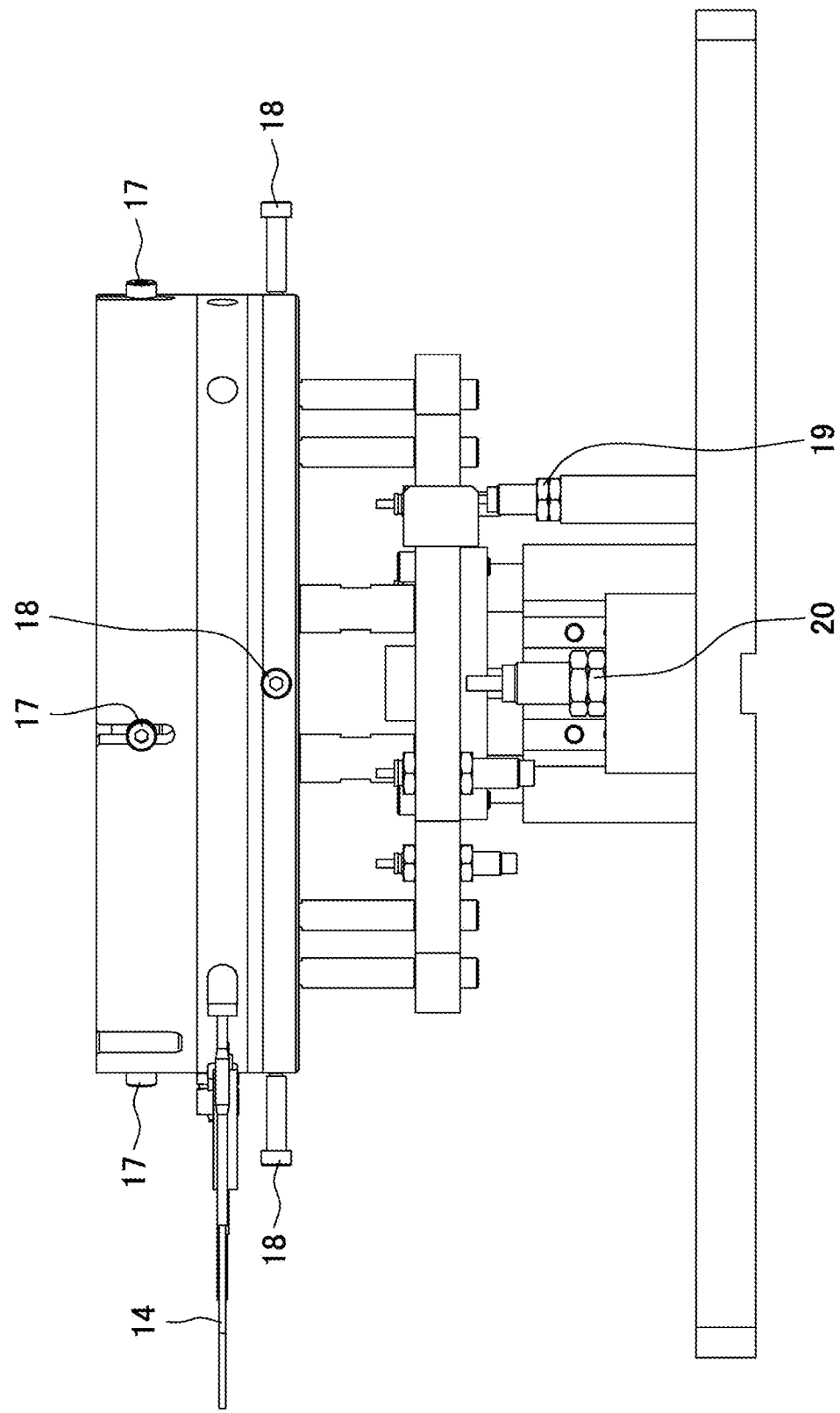
FIG. 5 is a side view of FIG. 4 after removing some of the components.

FIG. 4 is a side view of an embodiment of the adhesive application system of the present invention. The numeral 19 denotes shock absorbers for attenuating the impact of the elevating and lowering movement of the outer adhesive application device 4 comprising the circular arc groove-shaped adhesive application zones 11. The numeral 20 denotes a shock absorber for attenuating the impact of the elevating and lowering movement of the inner adhesive application device 3 comprising the annular groove-shaped adhesive application zone 10 and the central circular area 10a and the outer annular area 10b.

Figure 6:
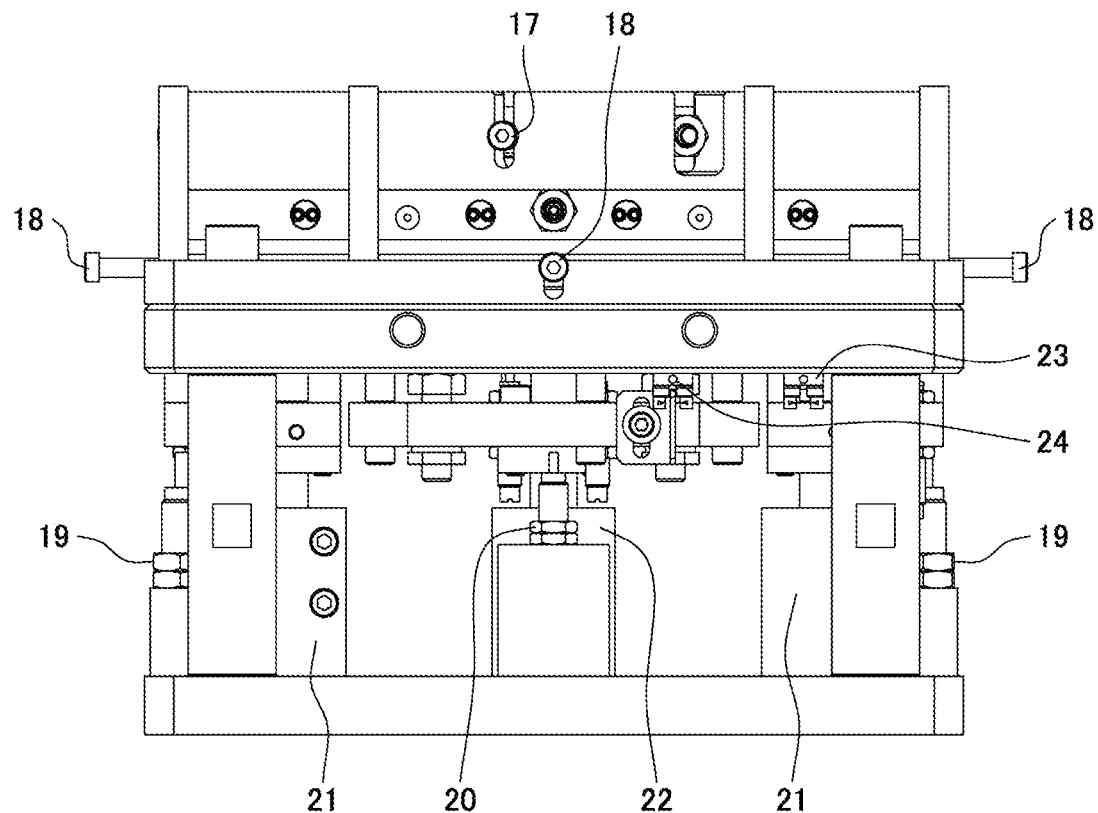
FIG. 6 is a front view of an embodiment of the adhesive application system of the present invention.
Figure 7:
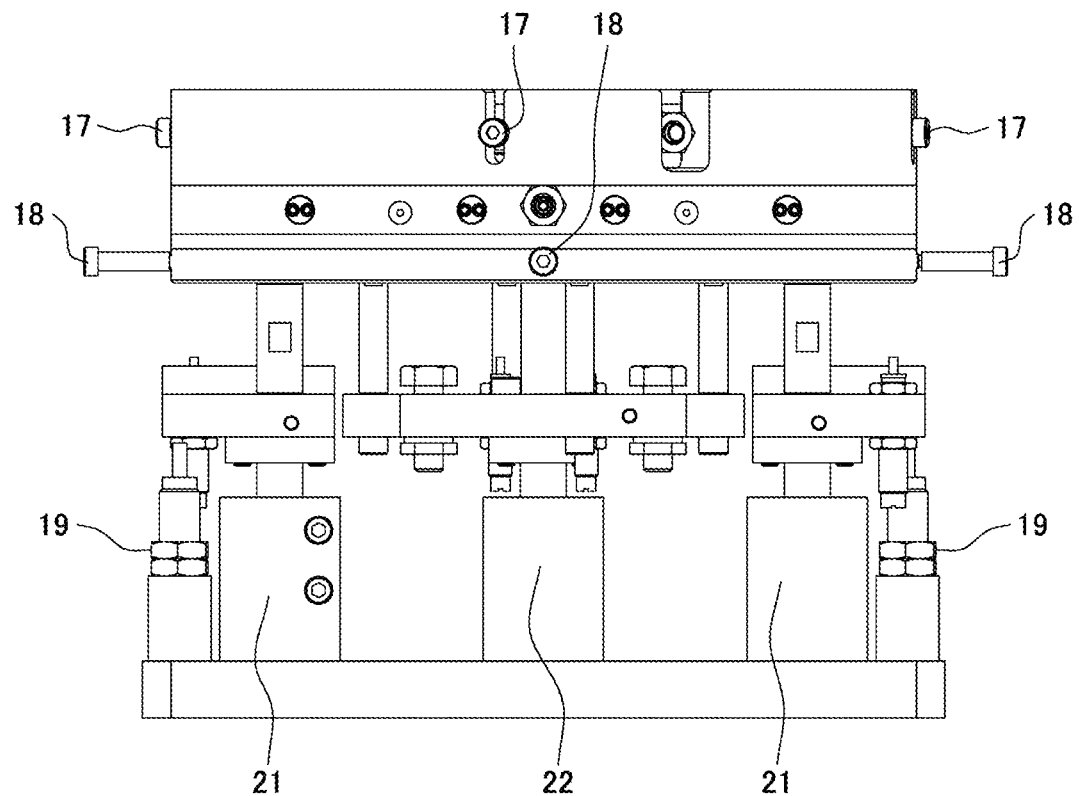
FIG. 7 is a front view of FIG. 6 after removing some of the components.

FIG. 6 is a front view of an embodiment of the adhesive application system of the present invention. The numeral 21 denotes air cylinders for elevating and lowering the outer adhesive application device 4 comprising the circular arc groove-shaped adhesive application zones 11. The numeral 22 denotes an air cylinder for elevating and lowering the inner adhesive application device 3 comprising the annular groove-shaped adhesive application zone 10 and the central circular area 10a and the outer annular area 10b. The numeral 23 denotes a photomicrosensor for sensing the upper and lower limits of the movement of the air cylinders 21. The numeral 24 denotes a photomicrosensor for sensing the upper and lower limits of the movement of the air cylinder 22. The adhesive application devices are provided with more than one air cylinder 21 and more than one air cylinder 22.

Figure 8:
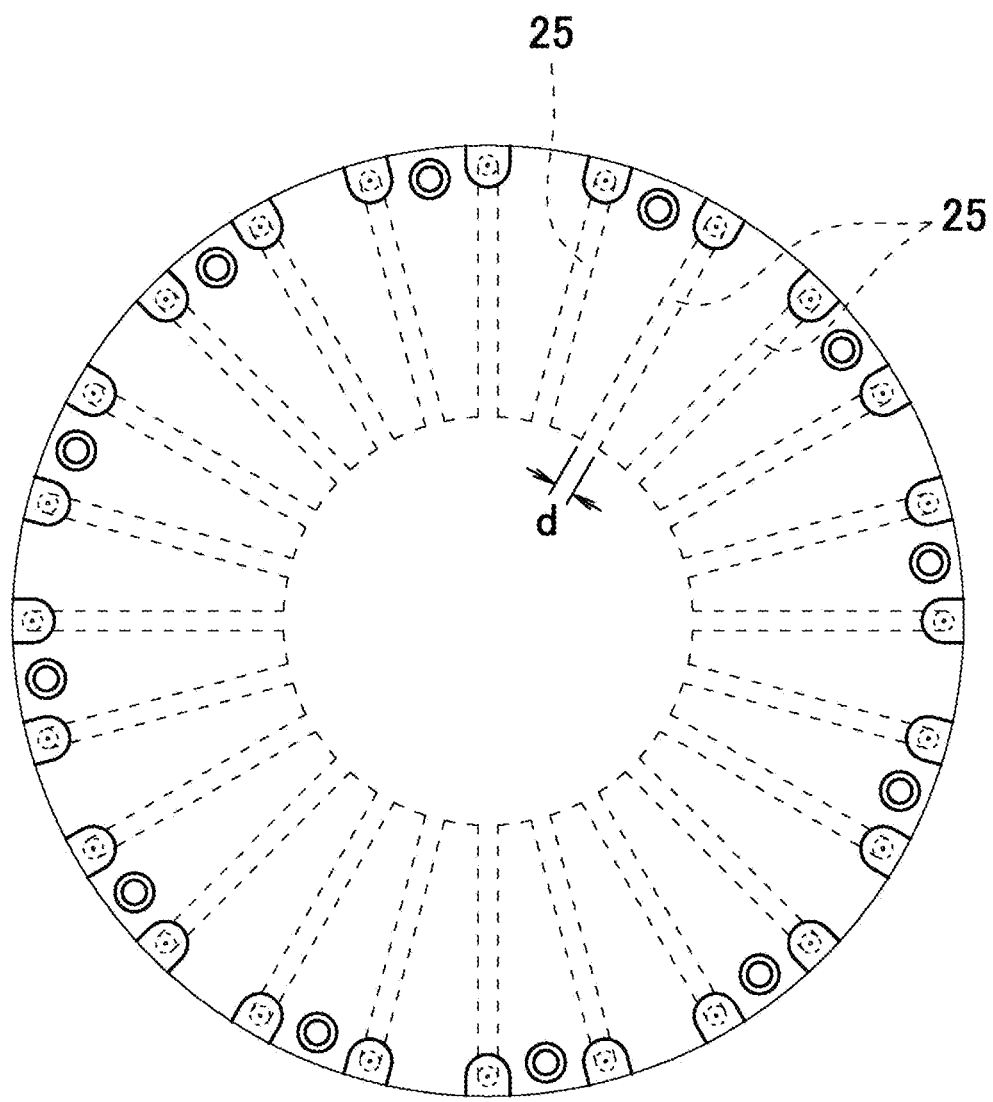
FIG. 8 is a plan view of an embodiment of adhesive flow passages in the adhesive application system of the present invention.
Figure 11:
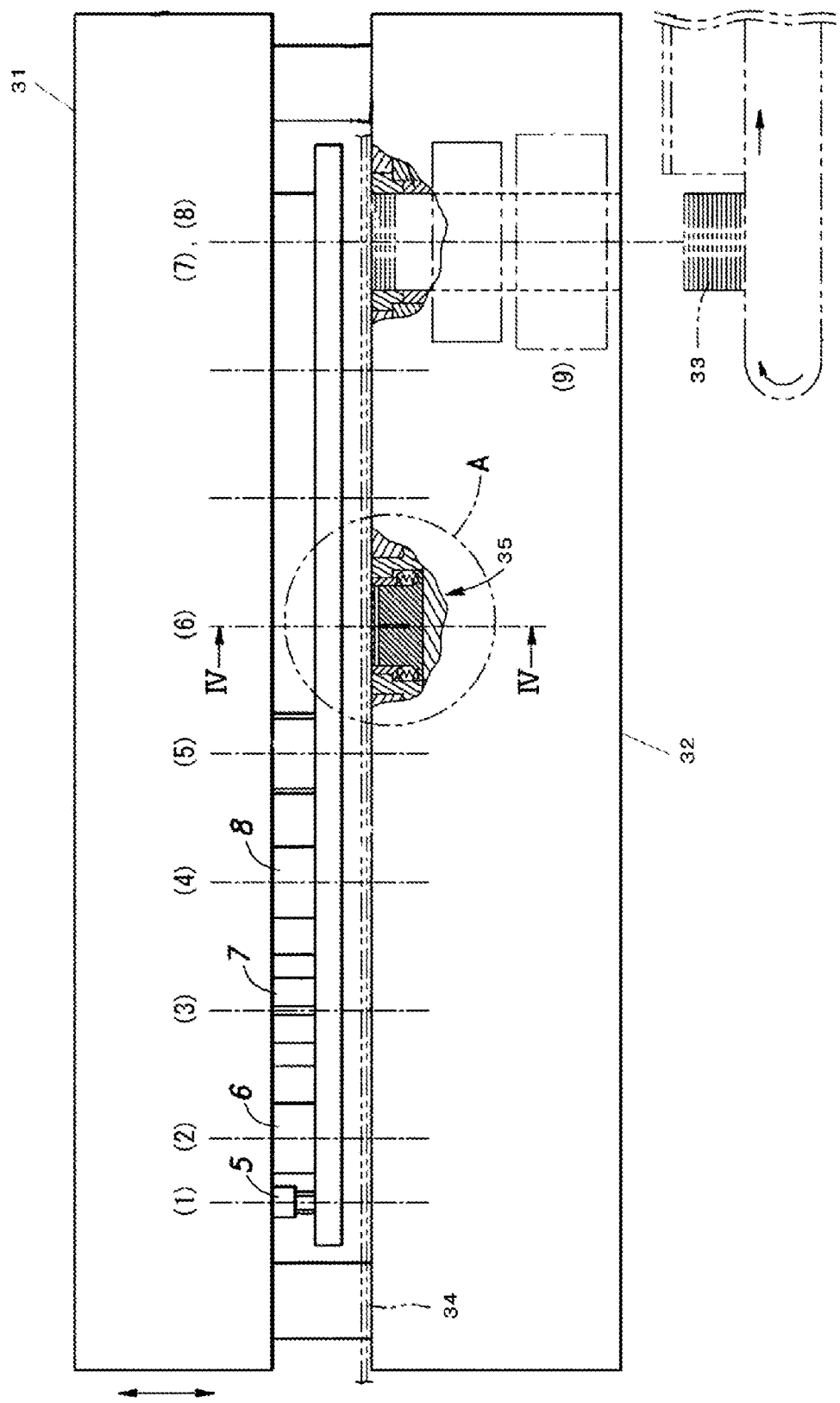
FIG. 11 is a schematic layout of an apparatus for producing a laminated steel core as disclosed in Patent literature 1.
Figure 12:
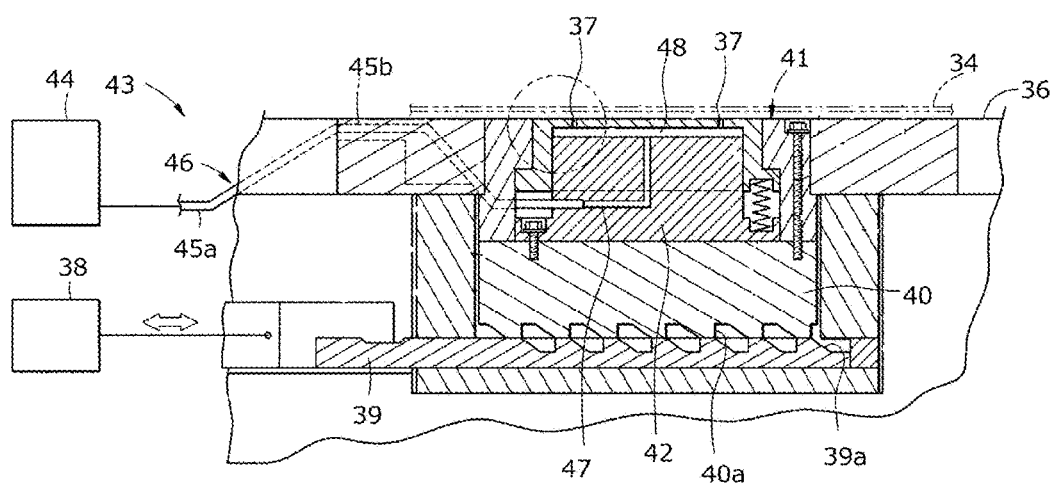
FIG. 12 is a side view showing the cross section of an adhesive application device installed in the apparatus for producing a laminated steel core as disclosed in Patent literature 1.

FIG. 8 is a plan view of an embodiment of adhesive flow passages in the adhesive application system of the present invention. The width d of the flow passages 25 in this embodiment is constant along its entire length. The adhesive is supplied through the flow passages 25, and then dispensed from the outlets of the adhesive dispense nozzles 26 distributed along the annular groove of the adhesive application zone 10 and from the outlets of the adhesive dispense nozzles 27 distributed along the circular arc grooves of the adhesive application zones 11 as shown in FIG. 3. FIG. 9 is a plan view of another embodiment of adhesive flow passages in the adhesive application system of the present invention. The width w of the flow passages 28 in this embodiment is tapered toward the outlets of the flow passages 28. When the length of the flow passages is relatively long, such tapered flow passages are advantageous in that the adhesive can be easily delivered to the outlets of the flow passages. The adhesive is supplied from the adhesive supply ports 17 and 18 shown in FIG. 3 to the flow passages 25 or 28. In FIG. 3, the annular groove-shaped adhesive application zone 10 and the circular arc groove-shaped adhesive application zones 11 are slightly depressed below the horizontal plane (or spaced inwardly away from the horizontal plane). Such concavely depressed adhesive application zones 10, 11 are advantageous in that the adhesive supplied through the flow passages 25 or 28 and dispensed from the outlets of the adhesive dispensing nozzles 26, 27 is not immediately applied to the lower surface of the thin steel strip (indicated by the numeral 2 in FIG. 1), but the adhesive that rises up from the outlets of the adhesive dispensing nozzles 26, 27 is applied to the lower surface of the thin steel strip so that the amount of the adhesive applied is substantially constant. The concave depression is not necessarily formed as a groove with a constant depth along the circumference of the adhesive application zones. Alternatively, a spotface (or a step) surrounding each of the outlets of the dispense nozzles 26, 27 may be provided.

A method for applying an adhesive to a thin steel strip using the adhesive application system configured as described above will be described below.

The adhesive is not continuously applied to the thin steel strip 2, but is rather applied to the thin steel strip 2 in synchronization with the timing of punching the thin steel strip 2 into a predetermined shape by lowering the upper die 7 toward the lower die 8 in the configuration as shown FIG. 1. In particular, when referring to FIG. 1, at the timing when punching is not performed, a predetermined distance (about several millimeters) is provided between the thin steel strip 2 and the surfaces of the components of the apparatus for producing a laminated steel core, including the top surface of the inner adhesive application device 3, the top surface of the outer adhesive application device 4, the top surfaces of platforms 9a, 9b and the top surface of the lower die 8. In the configuration shown in the figure, at the timing when the upper die 7 is lowered toward the lower die 8 to punch the thin steel strip 2 into a predetermined shape, the thin steel strip 2 is pressed against the lower die 8. Since the inner and outer adhesive application devices 3, 4 are configured to be independently elevated and lowered, the lower surface of the thin steel strip 2 can be brought into abutment against the top surface of either of the inner and outer adhesive application devices 3, 4. The adhesive stored in a tank (not shown) is constantly supplied to the inner and outer adhesive application devices 3, 4 at a predetermined pressure, and a constant amount of the adhesives that rises up from the outlets of the adhesive dispensing nozzles (indicated by the numerals 26 and 27 in FIG. 3) is applied to the lower surface of the thin steel strip 2. The inner and outer adhesive application devices 3, 4 are located below the thin steel strip 2 in FIG. 1, but the inner and outer adhesive application devices 3, 4 may be located above the thin steel strip 2. Whether the inner and outer adhesive application devices 3, 4 are located above or below the thin steel strip 2 can be determined considering the accompanying conditions, such as interference by other devices or the equipment cost.

After the adhesive is applied to the lower surface of the thin steel strip 2 as described above, the thin steel strip 2 is punched by the upper and lower dies 7, 8 and optionally subsequent upper and lower dies into a predetermined shape to produce steel core sheets. The steel core sheets having a predetermined shape are stacked on top of one another within the lower die 8 or an optionally subsequent lower die. After the stacked core sheets reach a predetermined number, the stacked core sheets are dispensed from the lower die 8 or an optionally subsequent lower die. The stacked core sheets are subjected to a given post-treatment such as heating, and used for the assembly of electric parts. For example, when referring to FIG. 1, at the timing of punching the thin steel strip 2 into a predetermined shape by lowering the upper die 7 toward the lower die 8, only the inner adhesive application device 3 is elevated toward the lower surface of the thin steel strip 2 to apply the adhesive to the lower surface of the thin steel strip 2. The adhesive-applied thin steel strip 2 is punched by the upper and lower dies 7, 8 into a predetermined shape to produce a steel core sheet. The steel core sheet is stacked on another steel core sheet within the lower die 8. Then, at the timing of punching the thin steel strip 2 into a predetermined shape by lowering an optionally subsequent upper die toward an optionally subsequent lower die, only the outer adhesive application device 4 is elevated toward the lower surface of the thin steel strip 2 to apply the adhesive to the lower surface of the thin steel strip 2. The adhesive-applied thin steel strip 2 is punched by the subsequent upper and lower dies into a predetermined shape to produce a steel core sheet. The steel core sheet is stacked on another steel core sheet within the lower die.

The adhesive supplied from the adhesive-storing tank (not shown) at a predetermined pressure reaches the adhesive supply ports 17, 18 as shown in FIG. 3. The adhesive is then dispensed from the outlets of the adhesive dispensing nozzles 26 distributed along the annular groove of the adhesive application zone 10 of the inner adhesive application device 3 and from the outlets of the adhesive dispensing nozzles 27 distributed along the circular arc grooves of the adhesive application zones 11 of the outer adhesive application device 4, and is applied to the lower surface of the thin steel strip, as described above. The annular groove-shaped adhesive application zone 10 is configured to be elevated and lowered together with the central circular area 10a and the outer annular area 10b by one of the elevating and lowering mechanisms (described in detail later). The circular arc groove-shaped adhesive application zones 11 are configured to be elevated and lowered by another elevating and lowering mechanism. In this manner, the inner and outer adhesive application devices 3, 4 are integrated into a single system, and the inner and outer adhesive application devices 3, 4 may be configured to be independently elevated and lowered. Due to this configuration, miniaturization of the adhesive application devices, the dies and the apparatus for producing a laminated steel core can be achieved and the configuration of the apparatus can be simplified, which may lead to a significant reduction in the equipment cost.

Specifically, in the inner adhesive application device 3, the annular groove-shaped adhesive application zone 10 is configured to be elevated and lowered together with the central circular area 10a and the outer annular area 10b by the air cylinder 22 as shown in FIG. 6. In the outer adhesive application device 4, the circular arc groove-shaped adhesive application zones 11 are configured to be elevated and lowered by the air cylinders 21 as shown in FIG. 6.

The depressed groove-shaped adhesive application zones are formed in such a manner that the outlets of the adhesive dispensing nozzles are maintained at a predetermined distance from the top surfaces of the adhesive application devices. This configuration has significant effects as described below. When the adhesive application devices are elevated so that the top surfaces of the adhesive application devices are brought into abutment against the lower surface of the thin steel strip 2, the adhesive that dispensed and rises up from the outlets of the adhesive dispensing nozzles 26, 27 is applied to the lower surface of the thin steel strip 2. If an error in the elevation distance of the adhesive application devices occurs, the amount of the adhesive applied to the lower surface of the thin steel strip 2 may vary. However, according to the invention, the outlets of the adhesive dispensing nozzles 26, 27 are maintained at a predetermined distance from the top surfaces of the adhesive application devices, and thus when the thin steel strip 2 is pressed against the lower die 8, the thin steel strip 2 is pressed against the top surfaces of the adhesive application devices but the outlets of the adhesive dispensing nozzles 26, 27 are maintained at a predetermined distance from the lower surface of the thin steel strip 2. Even when the thin steel strip 2 is not completely flat, the thin steel strip 2 pressed against the lower die 8 is pressed against the top surfaces of the adhesive application devices, but the outlets of the adhesive dispensing nozzles 26, 27 are maintained at a predetermined distance from the lower surface of the thin steel strip 2, regardless of the shape of the surface of the thin steel strip 2. The adhesive dispensing nozzles 26 or 27 arranged to communicate with each other are also advantageous in that they allow a uniform amount of the adhesive to be applied to the thin steel strip. When a plurality of adhesive application devices are not simultaneously used to apply the adhesive to the thin steel strip 2, the air cylinders 21 and/or the air cylinder 22 and lift pins (not shown) may be used to elevate and lower the thin steel strip 2.

The adhesive application devices are capable of being independently elevated and lowered and thus a constant amount of the adhesive that rises up from the outlets of the adhesive dispensing nozzles (indicated by the numerals 26 and 27 in FIG. 3) is applied to the lower surface of the thin steel strip 2 as described above according to the invention. However, the adhesive application devices may slightly incline to the right or left due to equipment degradation over time. Even in such a case, the adhesive application devices having a plurality of adhesive dispensing nozzles arranged so that the outlets of the adhesive dispensing nozzles are spaced inwardly away from the end faces of the adhesive application devices can be used to apply a constant amount of the adhesive to the thin steel strip as described below. As shown in FIG. 10A, the inner and outer adhesive application devices are each capable of being independently elevated and lowered in the directions as indicated by the double-headed vertical arrows, according to the invention. An example case will be described where the adhesive application devices slightly incline to the bottom right direction due to equipment degradation over time. On the left-hand side of FIG. 10A, the outlet of an adhesive dispensing nozzle of the outer adhesive application device is located inwardly relative to the end face of the lower die at distance a. On the right-hand side of FIG. 10A, the outlet of another adhesive dispensing nozzle of the outer adhesive application device is located inwardly relative to the end face of the lower die at distance c. The outlet of the adhesive dispensing nozzle on the right-hand side of FIG. 10A is located inwardly relative to the end face of the outer adhesive application device at distance b. The distances a, b and c satisfy the relation of a<b<c. In this example, the thin steel strip is assumed not to have a flat surface.

When the thin steel strip is pressed against the lower die as shown in FIG. 10B, the adhesive application devices slightly rotate counterclockwise around the center of the inner adhesive application device, which serves as the rotation center. The end faces of the adhesive application devices are located at the same height as that of the end face of the lower die (a=b=c), and the surface of the thin steel strip sandwiched between the upper and lower dies becomes flat. In this manner, a constant amount of the adhesive dispensed from the outlets of the adhesive dispensing nozzles located inwardly relative to the end faces of the adhesive application devices is applied to the thin steel strip.

The movement of the air cylinders 21, 22 is controlled by the electromagnetic valve 13 as shown in FIG. 2. The upper and lower limits of the elevating and lowering movement of the air cylinders are sensed by the photomicrosensors 23, 24 as shown in FIG. 6. The shock absorbers 19, 20 as shown in FIG. 4 attenuate the impact of the elevating and lowering movement on the components of the apparatus and shorten a waiting time until the vibration by the impact stops.

The adhesive application system of the invention comprises the plurality of laser sensors 12 for sensing the application of the adhesive to the thin steel strip as shown in FIG. 2. When the laser sensors 12 detect that the adhesive application devices have failed to apply the adhesive to the thin steel strip, this information detected by the laser sensors 12 is sent as a feedback to the tank (not shown) storing the adhesive, and supply of the adhesive to the inner and outer adhesive application devices 3, 4 is stopped to allow the operator to carry out necessary procedures such as inspection and repair.

The cartridge heaters 14 for increasing the temperature of the adhesive are coupled to a power supply (not shown) in FIG. 2. By heating the adhesive with the cartridge heaters 14, the fluidity of the adhesive can be increased and the adhesive can be stably dispensed from the outlets of the adhesive dispensing nozzles 26, 27 as shown in FIG. 3. The temperature sensors 15, 16 can sense an abnormal rise in the temperature in the adhesive application system, and based on the detected temperature, the number of the cartridge heaters 14 in operation can be adjusted as needed. Since the inner and outer adhesive application devices 3, 4 are located outside the upper and lower dies 7, 8, the temperature rise by the cartridge heaters 14 has no influence on the dies, and simultaneously, temperature changes in the dies have no influence on the fluidity of the adhesive.

INDUSTRIAL APPLICABILITY

The adhesive application system of the present invention can be used to apply an adhesive to a thin steel strip for the production of laminated steel cores for stepper motors or motor cores.

REFERENCE SIGNS LIST

1 Coil
2 Thin steel strip
3 Inner adhesive application device
4 Outer adhesive application device
5 Elevating and lowering mechanism for inner adhesive application device
6 Elevating and lowering mechanism for outer adhesive application device
7 Upper die
8 Lower die
9a, 9b Platforms
10 Annular groove-shaped adhesive application zone
10a Central circular area
10b Outer annular area
11 Circular arc groove-shaped adhesive application zones
12 Laser sensors
13 Electromagnetic valve
14 Cartridge heaters
15, 16 Temperature sensors
17, 18 Adhesive supply ports
19, 20 Shock absorbers
21, 22 Air cylinders
23, 24 Photomicrosensors
25, 28 Flow passages
26, 27 Adhesive dispensing nozzles

The invention claimed is:

1. An adhesive application system for applying an adhesive to a thin steel strip in a process comprising punching the thin steel strip into core sheets with a predetermined shape and stacking and bonding the core sheets together, the adhesive application system comprising
  an adhesive application device having an adhesive dispensing nozzle for dispensing an adhesive to an adhesive application surface of a thin steel strip;
  a mechanism configured to elevate and lower the adhesive application device; and
  an adhesive supply port for supplying the adhesive at a predetermined pressure to the adhesive application device,
  wherein the adhesive application device has an end face that is to be brought into abutment against the thin steel strip, and wherein an outlet of the adhesive dispensing nozzle is spaced inwardly away from the end face of the adhesive application device so that the outlet of the adhesive dispensing nozzle is maintained at a predetermined distance from a lower surface of the thin steel strip.

2. The adhesive application system according to claim 1, wherein the adhesive application device is located above or below the thin steel strip.

3. The adhesive application system according to claim 2, further comprising a mechanism configured to bring the thin steel strip into abutment against the adhesive application device at the timing when the thin steel strip is punched into a predetermined shape.

4. The adhesive application system according to claim 3, wherein a plurality of adhesive dispensing nozzles are provided, and wherein the plurality of adhesive dispensing nozzles communicate with each other.

5. The adhesive application system according to claim 4, further comprising a heating mechanism for the adhesive.

6. The adhesive application system according to claim 3, further comprising a heating mechanism for the adhesive.

7. The adhesive application system according to claim 2, wherein a plurality of adhesive dispensing nozzles are provided, and wherein the plurality of adhesive dispensing nozzles communicate with each other.

8. The adhesive application system according to claim 7, further comprising a heating mechanism for the adhesive.

9. The adhesive application system according to claim 2, further comprising a heating mechanism for the adhesive.

10. The adhesive application system according to claim 1, further comprising a mechanism configured to bring the thin steel strip into abutment against the adhesive application device at the timing when the thin steel strip is punched into a predetermined shape.

11. The adhesive application system according to claim 10, wherein a plurality of adhesive dispensing nozzles are provided, and wherein the plurality of adhesive dispensing nozzles communicate with each other.

12. The adhesive application system according to claim 11, further comprising a heating mechanism for the adhesive.

13. The adhesive application system according to claim 10, further comprising a heating mechanism for the adhesive.

14. The adhesive application system according to claim 1, wherein a plurality of adhesive dispensing nozzles are provided, and wherein the plurality of adhesive dispensing nozzles communicate with each other.

15. The adhesive application system according to claim 14, further comprising a heating mechanism for the adhesive.

16. The adhesive application system according to claim 1, further comprising a heating mechanism for the adhesive.

* * * * *